United States Patent
Wang et al.

(10) Patent No.: US 9,699,673 B1
(45) Date of Patent: Jul. 4, 2017

(54) MAINTAINING ACTIVE SESSIONS DURING SUBSCRIBER MANAGEMENT SYSTEM MAINTENANCE ACTIVITIES

(71) Applicant: AT&T Intellectual Property I, L.P., Atlanta, GA (US)

(72) Inventors: Jiansong Wang, Parlin, NJ (US); Ryan Redfern, Cerritos, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/051,347

(22) Filed: Feb. 23, 2016

(51) Int. Cl.
*H04W 24/04* (2009.01)
*H04W 8/18* (2009.01)
*H04W 76/04* (2009.01)
*H04W 76/06* (2009.01)

(52) U.S. Cl.
CPC ............ *H04W 24/04* (2013.01); *H04W 8/18* (2013.01); *H04W 76/04* (2013.01); *H04W 76/06* (2013.01)

(58) Field of Classification Search
None
See application file for complete search history.

(56) References Cited

U.S. PATENT DOCUMENTS

| 7,500,158 | B1 | 3/2009 | Smith et al. |
| 8,811,172 | B1 | 8/2014 | Sella |
| 9,015,212 | B2 | 4/2015 | David et al. |
| 9,088,803 | B2 | 7/2015 | Li et al. |
| 2012/0131184 | A1* | 5/2012 | Luna ............... H04W 28/14 709/224 |
| 2013/0010693 | A1* | 1/2013 | Luna ............... H04W 28/14 370/328 |
| 2014/0173018 | A1 | 6/2014 | Westphal et al. |

(Continued)

FOREIGN PATENT DOCUMENTS

| CN | 104486194 A | 4/2015 |
| EP | 2335437 A1 | 6/2011 |

(Continued)

OTHER PUBLICATIONS

Alcatel-Lucent, "Service Continuity for Today's VoLTE Subscribers," alcatel-lucent.com, 2012. http://resources.alcatel-lucent.com/?cid=183825. 17 pages.

(Continued)

*Primary Examiner* — Diane Mizrahi
(74) *Attorney, Agent, or Firm* — Amin, Turocy & Watson, LLP

(57) ABSTRACT

A subscriber management system for maintaining active communication sessions during subscriber maintenance activities is provided. The system can delay detaching mobile devices from the mobile network when there are active communication sessions that are associated with subscriber management maintenance activities or customer care activities in order to avoid disrupting the subscriber experience. The system can delay deleting the subscriber information until the active sessions have ended, which will allow the customer care activities to continue uninterrupted. In an embodiment, the subscriber management system can determine whether to detach the active communication session based on the priority of the session, such as whether it is real-time, or with a customer care element of the mobile network.

20 Claims, 10 Drawing Sheets

(56) References Cited

U.S. PATENT DOCUMENTS

| | | |
|---|---|---|
| 2014/0192645 A1 | 7/2014 | Zhang et al. |
| 2015/0055623 A1 | 2/2015 | Li et al. |
| 2015/0063112 A1 | 3/2015 | Wu et al. |
| 2015/0081906 A1* | 3/2015 | Backholm ............ H04W 74/06 709/225 |
| 2015/0124583 A1 | 5/2015 | May et al. |
| 2015/0149643 A1 | 5/2015 | Hu et al. |
| 2015/0163152 A1 | 6/2015 | Li |
| 2015/0163162 A1 | 6/2015 | DeCusatis et al. |
| 2015/0181617 A1* | 6/2015 | Luna ..................... H04W 74/06 455/450 |
| 2016/0029402 A1* | 1/2016 | Backholm ............ H04W 76/02 370/329 |

FOREIGN PATENT DOCUMENTS

| | | |
|---|---|---|
| KR | 101541531 B1 | 8/2015 |
| WO | 2015026785 A2 | 2/2015 |
| WO | 2015070909 A1 | 5/2015 |
| WO | 2015174988 A1 | 11/2015 |

OTHER PUBLICATIONS

Nokia, "Subscriber Data Management," networks.nokia.com, Jan. 6, 2015 https://web.archive.org/web/20150106235312/http://networks.nokia.com/portfolio/products/subscriber-data-management. 2 pages.

Oracle, "Oracle® Communications Subscriber Data Management," Oracle, docs.oracle.com, Oct. 2014. https://docs.oracle.com/cd/E48805_01/doc.93/910-6866-001_rev_b.pdf. pp. 1-105.

Oracle, "Oracle® Communications Subscriber Data Management," Oracle, docs.oracle.com, Oct. 2014. https:// docs.oracle.com/cd/E48805_01/doc.93/910-6866-001_rev_b.pdf. pp. 106-210.

Oracle, "Oracle® Communications Subscriber Data Management," Oracle, docs.oracle.com, Oct. 2014. https:// docs.oracle.com/cd/E48805_01/doc.93/910-6866-001_rev_b.pdf. pp. 211-320.

Oracle, "Oracle® Communications Subscriber Data Management," Oracle, docs.oracle.com, Oct. 2014. https:// docs.oracle.com/cd/E48805_01/doc.93/910-6866-001_rev_b.pdf. pp. 321-432.

* cited by examiner

MAINTAINING ACTIVE SESSIONS DURING SUBSCRIBER MANAGEMENT SYSTEM MAINTENANCE ACTIVITIES

TECHNICAL FIELD

The subject disclosure relates to maintaining active communication sessions during subscriber management system maintenance activities in a wireless communication environment.

BACKGROUND

Subscriber management system maintenance activities typically involve moving subscriber information from a subscription database under maintenance to another subscription database as a backup. This causes the original subscription database to delete the subscriber information records on mobile network components that provides mobility management (e.g., Mobility Management Entities or Serving GPRS Support Nodes). Due to 3GPP (3$^{rd}$ Generation Partnership Project) standards, however, the MME/SGSN immediately detaches the mobile device associated with the subscriber information from the network when the subscriber information is removed. Therefore, ongoing packet switched voice calls drop, which negatively affects subscriber experiences during maintenance activities and/or customer care activities.

DETAILED DESCRIPTION

Figure 1:
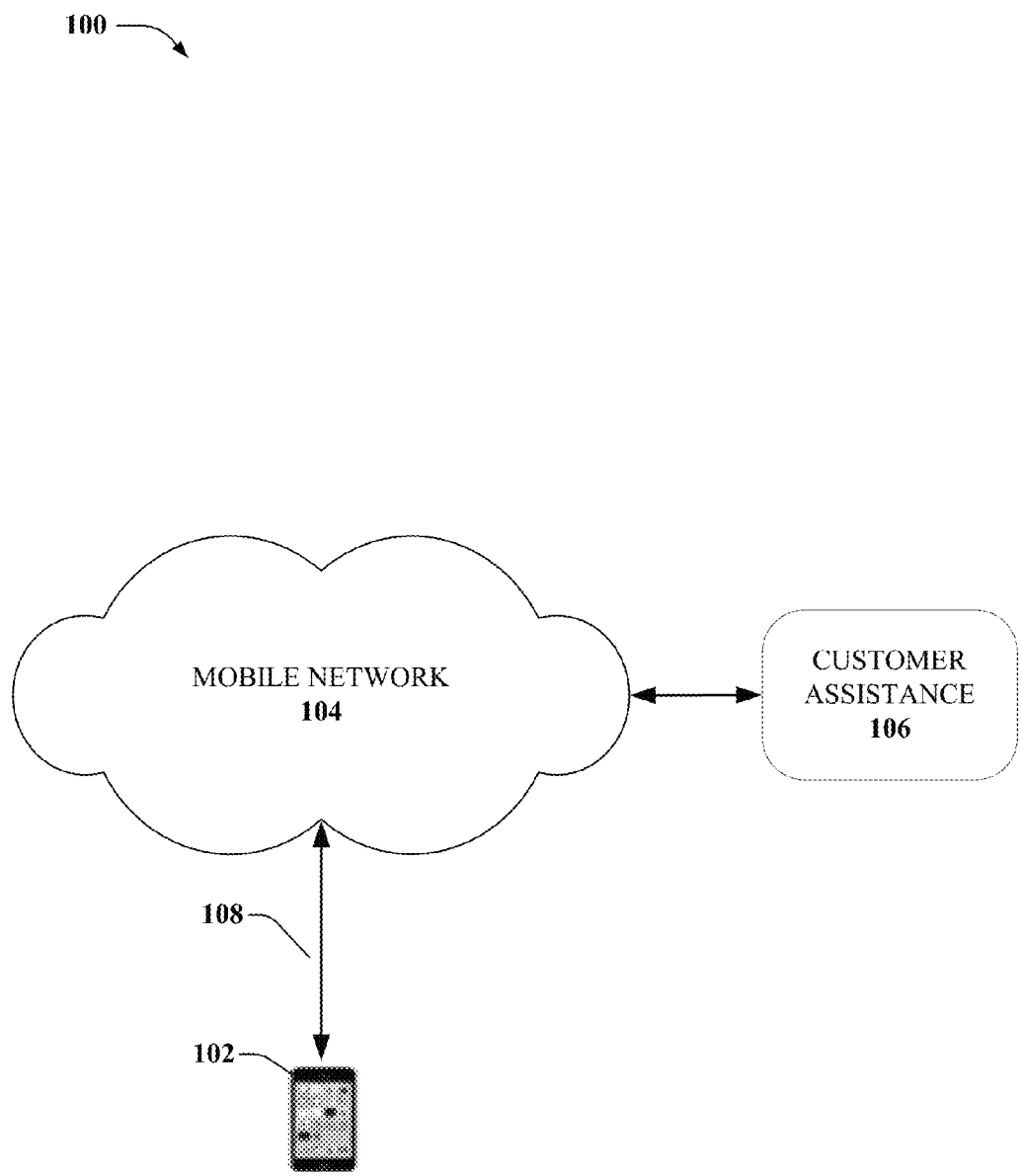
FIG. 1 is an example, non-limiting embodiment of a block diagram showing a subscriber management system that maintains an active communication session during subscriber management activities in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In one or more embodiments, a subscriber management system for maintaining active communication sessions during subscriber maintenance activities is provided. The system can delay detaching mobile devices from the mobile network when there are active communication sessions that are associated with subscriber management maintenance activities or customer care activities in order to avoid disrupting the subscriber experience. The system can delay deleting the subscriber information until the active sessions have ended, which will allow the customer care activities to continue uninterrupted. In an embodiment, the subscriber management system can determine whether to detach the active communication session based on the priority of the session, such as whether it is real-time, or with a customer care element of the mobile network.

During maintenance activities where customer care personnel may be assisting a subscriber by troubleshooting the subscriber's service issues, subscriber information may need to be re-provisioned. Reprovisioning the subscriber information typically results in a Home Subscriber Server (HSS) in an LTE network, or a Home Location Register (HLR) in a GSM core network, sending a cancel location request to the MME/SGSN in order to delete the old subscription profiles. Doing so results in the mobile device being detached from the network while the subscription information is re-provisioned. By delaying detachment of the packet switched active session until the active session has ended, the subscriber management system disclosed herein can improve the customer service experience by allowing the customer to continue communicating with customer care until the call is over.

In an embodiment, when the HSS/HLR sends the Cancel Location Request with a subscriber withdrawal flag attached, the subscriber management system in the MME/SGSN can determine whether the request is a true "Subscriber Withdrawal" or a Maintenance action. A true "Subscriber Withdrawal" action would mean that the subscriber's subscription is being revoked due to non-payment, or bad credit or other triggering factors such as switching carriers. In this case, the MME/SGSN detaches the mobile device immediately and prevents it from accessing the mobile network again until the billing dispute is resolved.

If the subscriber management system recognizes that this is a maintenance action, the subscriber management system can decide whether the user is on a packet switched voice call ("voice over PS") or not. If it is on a voice over PS call, the subscriber management system can delay the detach procedure until the user completes the voice over PS call and then refresh the subscription data and detach the mobile device. Then, the next time the mobile device attaches to the network, it will have the new subscription data ready. Therefore, the subscriber management system disclosed herein can maintain the voice call as long as possible by delaying the detach procedure in order to improve the user experience. Meanwhile, the subscription data is still refreshed once the voice is ended and the mobile device is ready to be refreshed.

For these considerations as well as other considerations, in one or more embodiments, a system comprises a processor and a memory that stores executable instructions that, when executed by the processor, facilitate performance of operations, comprising determining that a cancel location request has been received for a mobile subscriber account associated with a mobile device on a mobile network. The operations also comprise determining that the mobile device has an active communication session with the mobile network that satisfies a defined criterion relating to priority. The operations also comprise delaying detaching the mobile device based on the cancel location request until the active communication session has ended.

In another embodiment, a method comprises receiving, by a device comprising a processor, a cancel location request for a subscriber account associated with user equipment device. The method also comprises determining, by the device, that the cancel location request comprises a subscription withdrawal flag and a re-attach flag. The method also comprises determining, by the device, that the user equipment device has an active communication session that satisfies a defined criterion relating to priority. The method can also comprise detaching, by the device, the user equipment device from a mobile network after the active communication session is determined to have ended.

In another embodiment, a machine-readable storage medium, comprising executable instructions that, when executed by a processor, facilitate performance of operations comprising receiving a cancel location request for a subscriber account associated with user equipment device. The operations also comprise determining that the cancel location request comprises a subscription withdrawal flag and a re-attach flag. The operations further comprise determining that the user equipment device has an active communication session that satisfies a defined criterion relating to priority and detaching the user equipment device from a mobile network after the active communication session is determined to have ended.

Turning now to FIG. 1, illustrated is an example, non-limiting embodiment of a block diagram 100 showing a subscriber management system that maintains an active communication session during subscriber management activities in accordance with various aspects described herein.

The subscriber management system can reside on a mobile broadband network 104 that comprises a radio access network that facilitates communications between device 102 and a core network. In the case of Long Term Evolution ("LTE") networks and other 3rd Generation Partnership Project ("3GPP") compliant networks (e.g., LTE Advanced) and even non-3GPP systems such as WiMAX and CDMA2000, these networks are the radio access network and an evolved packet core network that can contain a series of components that provide mobile data and control management. The subscriber management system disclosed herein can be utilized in a network that comprises base station devices (eNodeBs) and Wi-Fi access points and other network access points. In some embodiments, the subscriber management system can be operable with user equipment or networked devices that are not directly attached to a mobile network system but rather have wireline networked access. For the sake of simplicity, throughout this application, reference will be made to a mobile network, but the subject matter disclosed herein can be operable in any networked environment.

In an embodiment, the mobile network 104 can facilitates communications for mobile device 102 and can also provide access to a customer assistance element 106. Customer assistance element 106 can be a helpdesk or other service that provides troubleshooting and assistance for mobile network subscribers associated with mobile network 104. The customer assistance element 106 can also initiate mobile maintenance and management services with mobile devices including mobile device 102. In other embodiments, mobile device 102 can initiate customer service by contacting customer assistance 106. It is to be appreciated that while FIG. 1 shows customer assistance element 106 residing outside of the mobile network 104, in other embodiments, the customer assistance element 106 can be a part of mobile network 104, or another core network that is associated with mobile network 104.

It is to be appreciated that while reference is made throughout the application to network components in an Evolved Packet Core associated with the LTE standard, in other embodiments, the network components associated with other mobile network systems are covered by this disclosure.

In an embodiment, the customer assistance element 106 may attempt to reprovision subscription information associated with mobile device 102 to facilitate maintenance and/or troubleshooting activities. In order to reprovision the subscription information, the customer assistance element 106 can send an instruction to the mobile network 104 to start the reprovisioning process. An HSS, which can contain subscription profile information and perform authentication and authorization of the subscribers can delete the subscription information and reload the information from another database. Before doing this however, the HSS can send a cancel location request to an MME in the mobile network to initiate detachment of mobile device 102 from the mobile network 104.

The subscriber management system (in some embodiments, a component or element of the MME) can determine whether the cancel location request has a subscription withdrawal flag and a reattached required flag. The subscription management system can then also determine whether or not the mobile network has an active communication session 108 with the mobile device 102. If the priority of the active communication session 108 satisfies a predefined criterion with regard to priority, the subscriber management system can delay detaching the mobile device 102 from the mobile network 104. In an embodiment, the subscriber management system can delay detaching the mobile device 102 from the mobile network 104 until the active communication session 108 has ended, or some other criteria have come to pass.

In an embodiment, the subscriber management system determines that the active communication session 108 satisfies the criterion relating to priority by determining that the active communication session is associated with a mobile network help session with customer assistance 106. In other embodiments, the priority is determined based on whether or not the active communication session 108 is related to a mobile network maintenance activity associated with mobile network 104. In other embodiments, the priority is determined based on whether or not the active communication session 108 is a real-time packet switched communication session, either voice (Voice over Internet Protocol), or video.

In an embodiment, the subscriber management system determines whether the cancel location request is a true "Subscriber Withdrawal" or a Maintenance action by checking to see if both the subscription withdrawal and re-attach required flags are set in the cancel location request. A true "Subscriber Withdrawal" action would mean that the subscriber's subscription is being revoked due to non-payment, or bad credit or other triggering factors such as switching carriers and would not require reattachment. In this case, the MME/SGSN detaches the mobile device immediately and prevents it from accessing the mobile network again until the billing dispute is resolved. If the re-attach required flag is set, then the cancel location request maybe likely due to a customer service or network maintenance action, and detachment of any active communication sessions can be delayed.

In an embodiment, the subscriber management system can detach any active communication sessions that do not meet the defined criterion relating to priority. For instance, if the mobile device 102 has another active communication session that is lower priority (e.g., downloading emails, web browsing, etc) mobile network 104 can detach the lower priority communication session while leaving session 108 dealing with customer assistance 106 or a maintenance activity active. The subscriber management system can also reprovision portions of the subscriber information in the HSS that are not likely to impact the active communication session 108. While reprovisioning the portion of the subscriber information, the subscriber management system can save the portion of subscription information in another subscriber database, and reload the portion to the first subscriber database.

Figure 2:
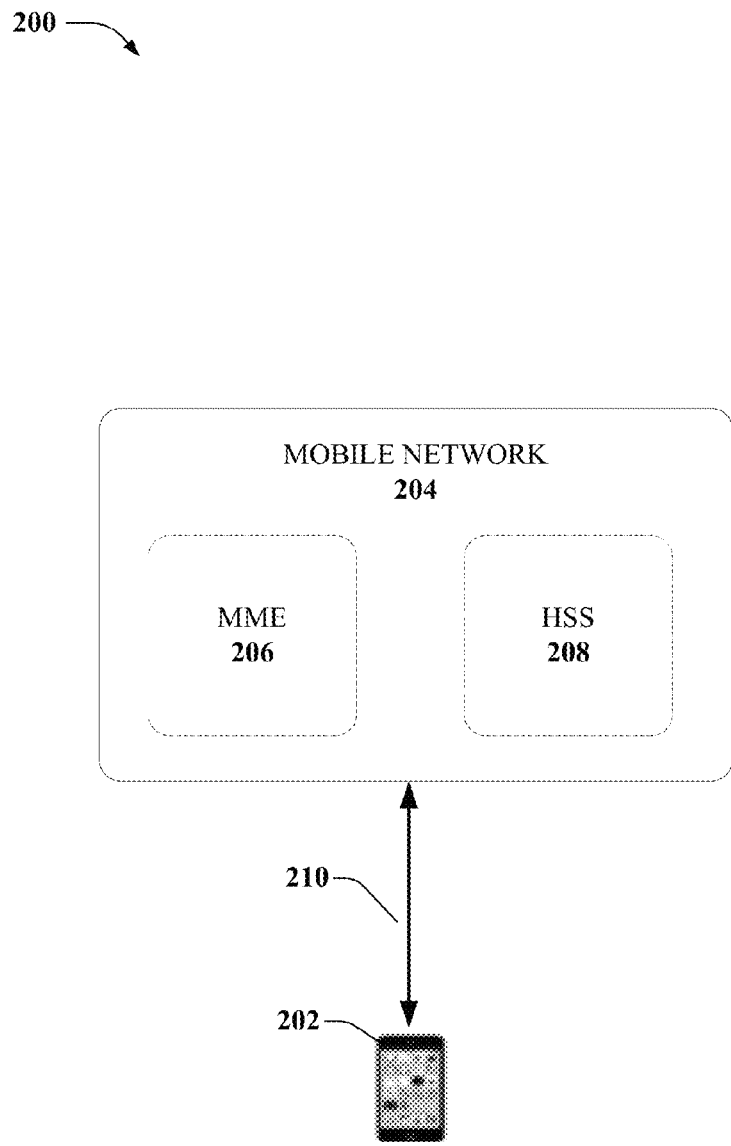
FIG. 2 is an example, non-limiting embodiment of a block diagram showing a subscriber management system in accordance with various aspects described herein.

Turning now to FIG. 2, illustrated is an example, non-limiting embodiment of a block diagram 200 showing a subscriber management system in accordance with various aspects described herein In an embodiment, the HSS 208 may attempt to reprovision subscription information associated with mobile device 202 to facilitate maintenance and/or troubleshooting activities. In order to reprovision the subscription information, the HSS 208, which can contain subscription profile information and perform authentication and authorization of the subscribers can delete the subscription information and reload the information from another database. Before doing this however, the HSS 208 can send a cancel location request to an MME 206 in the mobile network to initiate detachment of mobile device 202 from the mobile network 204.

The MME 206 can determine whether the cancel location request has a subscription withdrawal flag and a reattached required flag. The MME 206 can then also determine whether or not the mobile network has an active communication session 210 with the mobile device 202. If the priority of the active communication session 210 satisfies a predefined criterion with regard to priority, the MME 206 can delay detaching the mobile device 202 from the mobile network 204. In an embodiment, the MME 206 can delay detaching the mobile device 202 from the mobile network 204 until the active communication session 210 has ended, or some other criteria have come to pass.

In an embodiment, the MME 206 determines that the active communication session 210 satisfies the criterion relating to priority by determining that the active communication session 210 is associated with a mobile network help session or a network maintenance activity. In other embodiments, the priority is determined based on whether or not the active communication session 210 is a real-time packet switched communication session.

Figure 3:
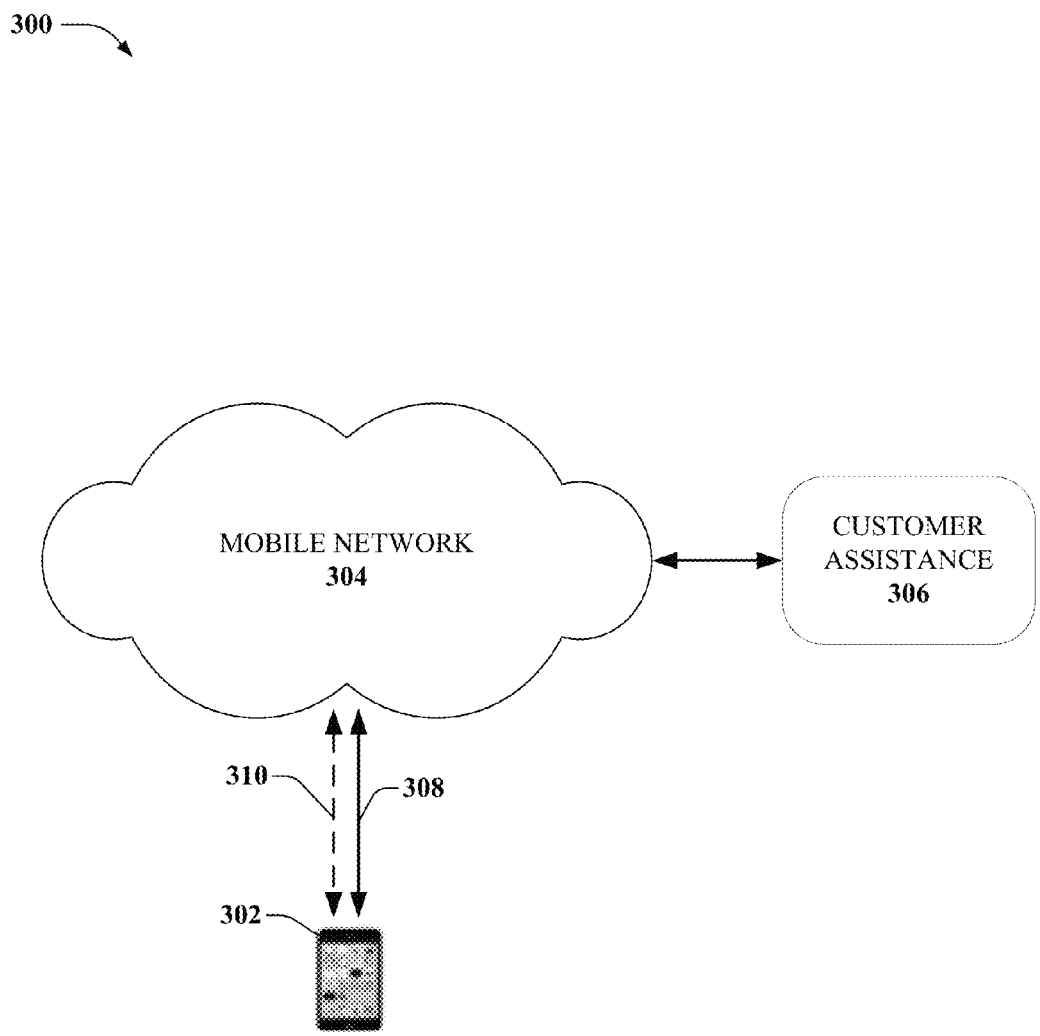
FIG. 3 is an example, non-limiting embodiment of a block diagram showing a subscriber management system that maintains an active communication session during subscriber management activities in accordance with various aspects described herein.

Turning now to FIG. 3, illustrated is an example, non-limiting embodiment of a block diagram 300 showing a subscriber management system that maintains an active session during subscriber management activities in accordance with various aspects described herein.

In an embodiment, the subscriber management system in a mobile network 304 determines whether the active communication sessions 308 and 310 satisfy a criterion relating to priority by determining that the active communication sessions 308 or 310 is associated with a mobile network help session with customer assistance 306. In other embodiments, the priority is determined based on whether or not the active communication session 308 or 310 is related to a mobile network maintenance activity associated with mobile network 304. In other embodiments, the priority is determined based on whether or not the active communication session 308 or 310 is a real-time packet switched communication session, either voice (Voice over Internet Protocol), or video.

In an embodiment, the subscriber management system can detach any active communication sessions (e.g. 310) that do not meet the defined criterion relating to priority. For instance, if active communication session 310 is lower priority (e.g., downloading emails, web browsing, etc) mobile network 304 can detach the lower priority communication session 310 while leaving session 308 dealing with customer assistance 306 or a maintenance activity active. The subscriber management system can also reprovision portions of the subscriber information in the HSS that are not likely to impact the active communication session 308. While reprovisioning the portion of the subscriber information, the subscriber management system can save the portion of subscription information in another subscriber database, and reload the portion to the first subscriber database.

FIGS. 4-8 illustrates a process in connection with the aforementioned systems. The processes in FIGS. 4-8 can be implemented for example by the systems in FIGS. 1-3. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 4:
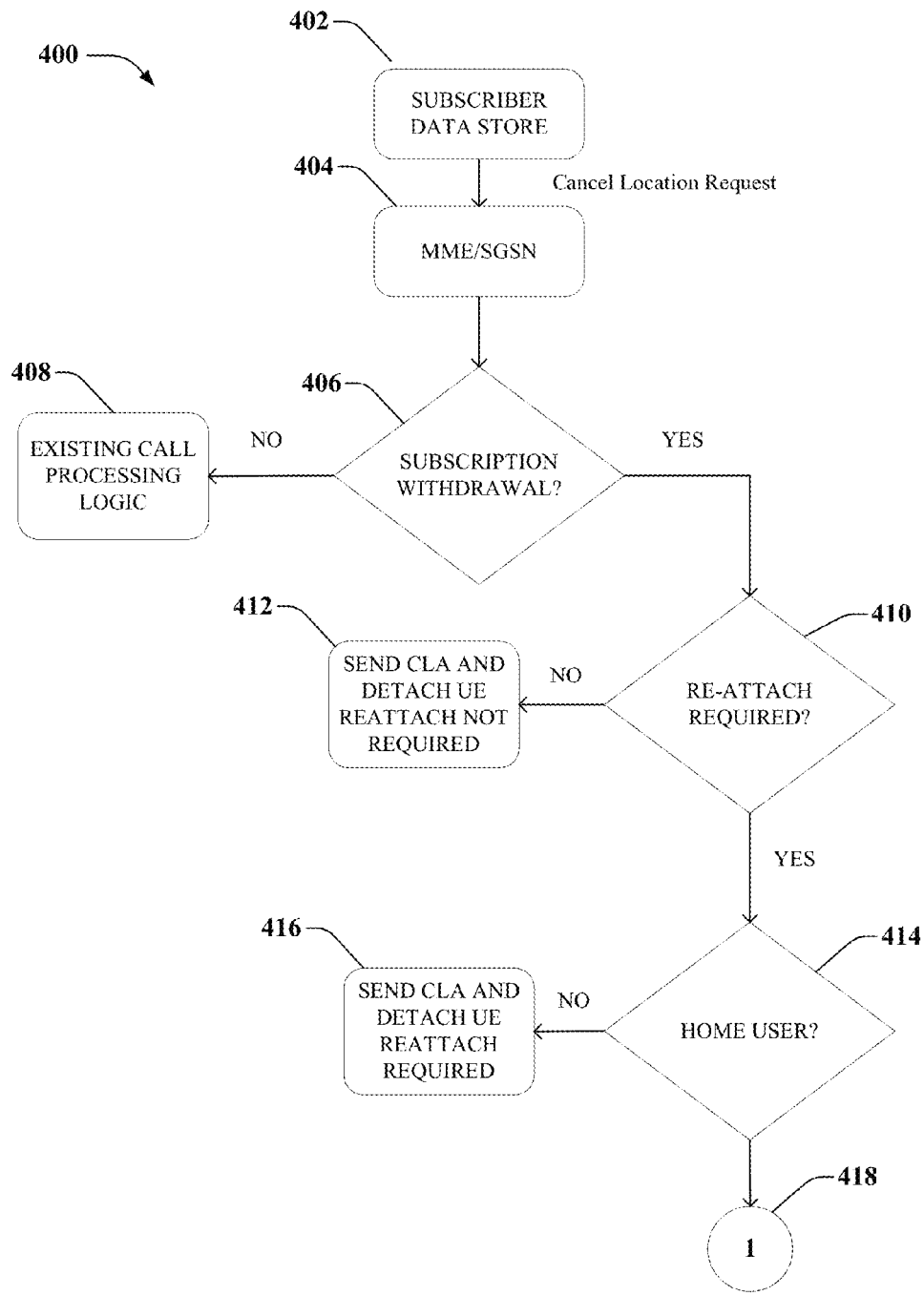
FIG. 4 illustrates a flow diagram of an example, non-limiting embodiment of a process for maintaining an active communication session during subscriber maintenance activities as described herein.

FIG. 4 illustrates a flow diagram 400 of an example, non-limiting embodiment of a process for maintaining an active communication session during subscriber maintenance activities as described herein.

Flow 400 can start at 402, where a subscriber data store, an HSS or HLR depending on the mobile network, can send a cancel location request to an MME/SGSN at 404 to initiate reprovisioning of subscriber information for a mobile device. At 406 the subscriber management system determines whether the cancel location request includes a subscription withdrawal flag. If there is no subscription withdrawal flag, existing call processing logic is performed at 408, but if there is a subscription withdrawal flag, the subscriber management system will determine whether there is a re-attach flag in the cancel location request at 410. If there is no re-attach flag, the subscriber management system will send a cancel location acknowledgement ("CLA") and detach the user equipment at 412, marking the detachment as re-attach not required.

If the subscriber management system determines at 410 however that there is a re-attach flag indicated in the cancel location request, the subscriber management system next determines at 414 whether or not the UE associated with the subscriber information is a home user. If the UE is not a home user, the CLA is sent, and the UE is detached and marked as re-attachment not required. If the UE is a home user however, the flow continues at 418 in FIG. 5.

Figure 5:
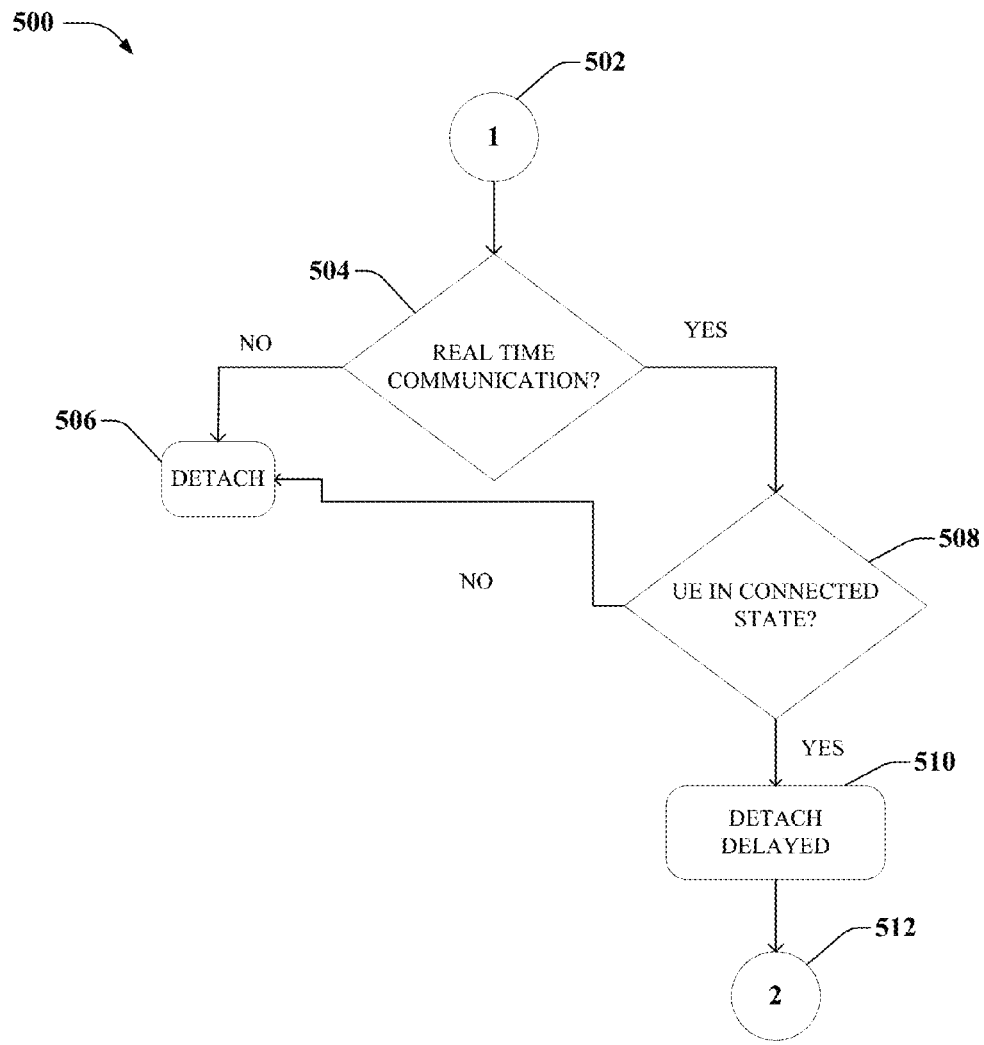
FIG. 5 illustrates a flow diagram of an example, non-limiting embodiment of a process for maintaining an active communication session during subscriber maintenance activities as described herein.

FIG. 5 illustrates flow 500 which begins at 502 and is a continuation of flow 400. At 504 the subscriber management system determines whether there is a real-time communication such as a Quality of Service Class of Identifier (QCI) 1 or 2 rated communication session (e.g., dedicated service guaranteed bearer) between the UE and the mobile network. If there is not a real-time communication, the priority level of any active communication sessions is below the predefined criteria, and so the UE is detached at 506. If there is a real-time communication however, the subscriber management system determines whether the UE is in a connected state at 508. If the UE is not in a connected state, the UE is detached at 506, but if the UE is in a connected state, the detach is delayed 510 until the UE is no longer in a detached state. When the CLA is sent to the HSS, all local subscription data for the UE is removed and all PDN connections except the IP multimedia subsystem access point name connection (IMS-APN) are deactivated. And the subscriber management system marks the update location request procedure as required for any next uplink UE NAS signaling activity. The flow continues from 512 in FIG. 6.

Figure 6:
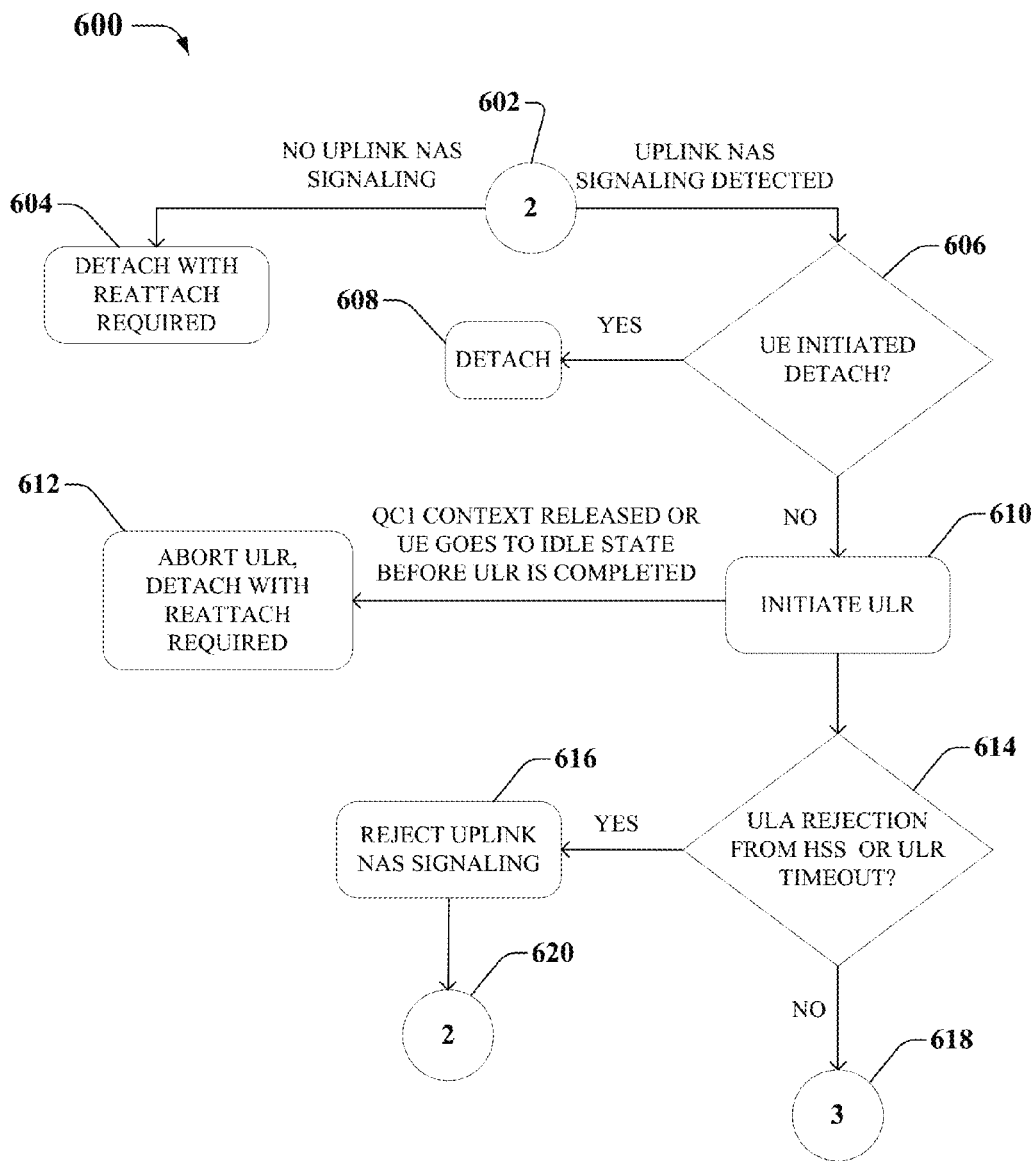
FIG. 6 illustrates a flow diagram of an example, non-limiting embodiment of a process for maintaining an active communication session during subscriber maintenance activities as described herein.

FIG. 6 illustrates flow 600 which begins at 602 and is a continuation of flow 500. At 602, if there is no uplink NAS (non-access stratum) signaling detected, the UE is detached at 604 with reattach required (after related network resources are cleaned up), whereas if there is uplink NAS signaling detected, the flow continues to 606. At 604, the QCI1 context is released or the UE goes to the EMM_idle (EPS Mobility Management) state. The MME can also still detach the UE in this Cancel Location State when the UE state is EMM_idle. An exception to this process can be in a Double 51 state where the Double 51 scenario handling is performed and the old 51 link is released, and the new 51 link is established.

At 606, the subscriber management system determines whether or not the UE initiated the detach, and if it did, then the UE is detached at 608 where all remaining UE contexts in the MME are removed. If the UE did not initiate the detach, the flow continues to 610 where the update location request ("ULR") procedure is initiated. At 612, if the QCI context is released or the UE goes to the EMM_idle state before the ULR procedure is completed, the MME can detach the UE with re-attach required, and the ULR procedure can be aborted.

At 614, if there is an update location answer ("ULA") rejection from HSS or ULR timeout, the uplink NAS signaling procedure goes back to 602. If there is no ULA rejection, then the flow continues at 618 in FIG. 7.

Figure 7:
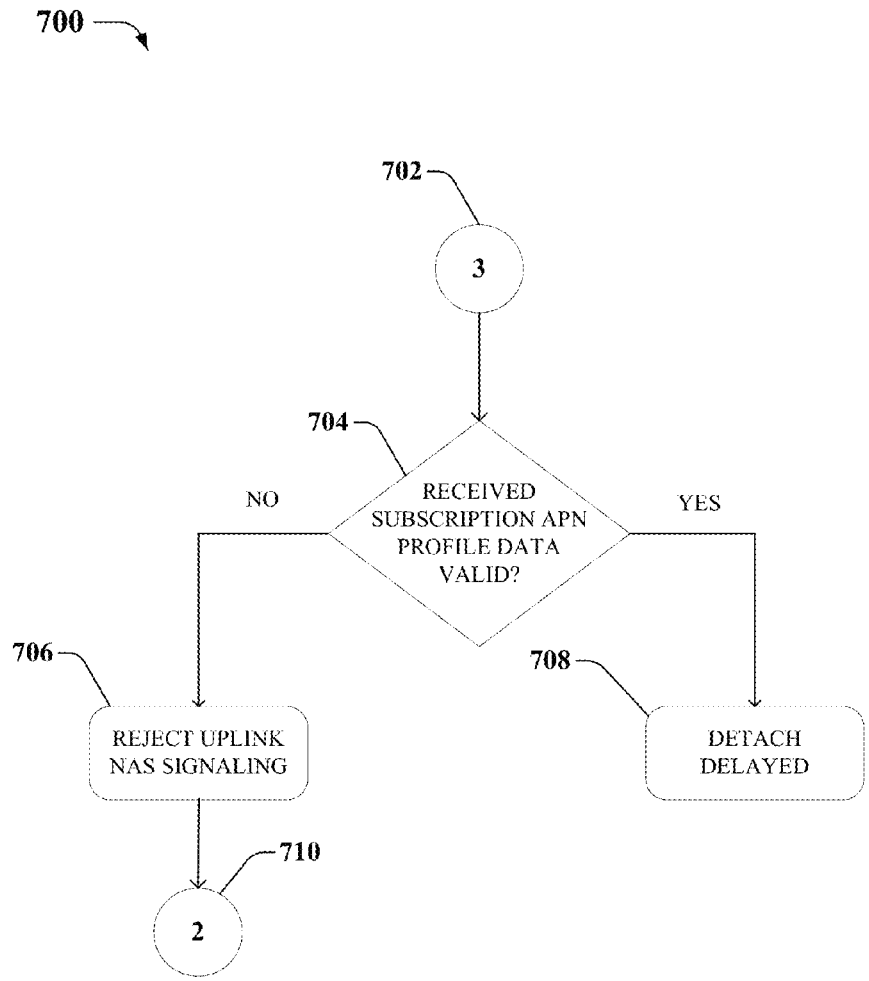
FIG. 7 illustrates a flow diagram of an example, non-limiting embodiment of a process for maintaining an active communication session during subscriber maintenance activities as described herein.

FIG. 7 illustrates flow 700 which begins at 702 and is a continuation of flow 600. At 704 the subscriber management system determines whether the subscription APN profile data is valid. If it is not valid, the uplink NAS signaling is rejected and proceeds to 710 which carries the flow back to 602. If the subscription APN profile data is valid, the detach is delayed at 708 and the subscriber management system temporarily saves the subscription data for the UE, and the uplink NAS procedure is continued. The ULR procedure is also marked as required for any next uplink UE NAS signaling activity.

Figure 8:
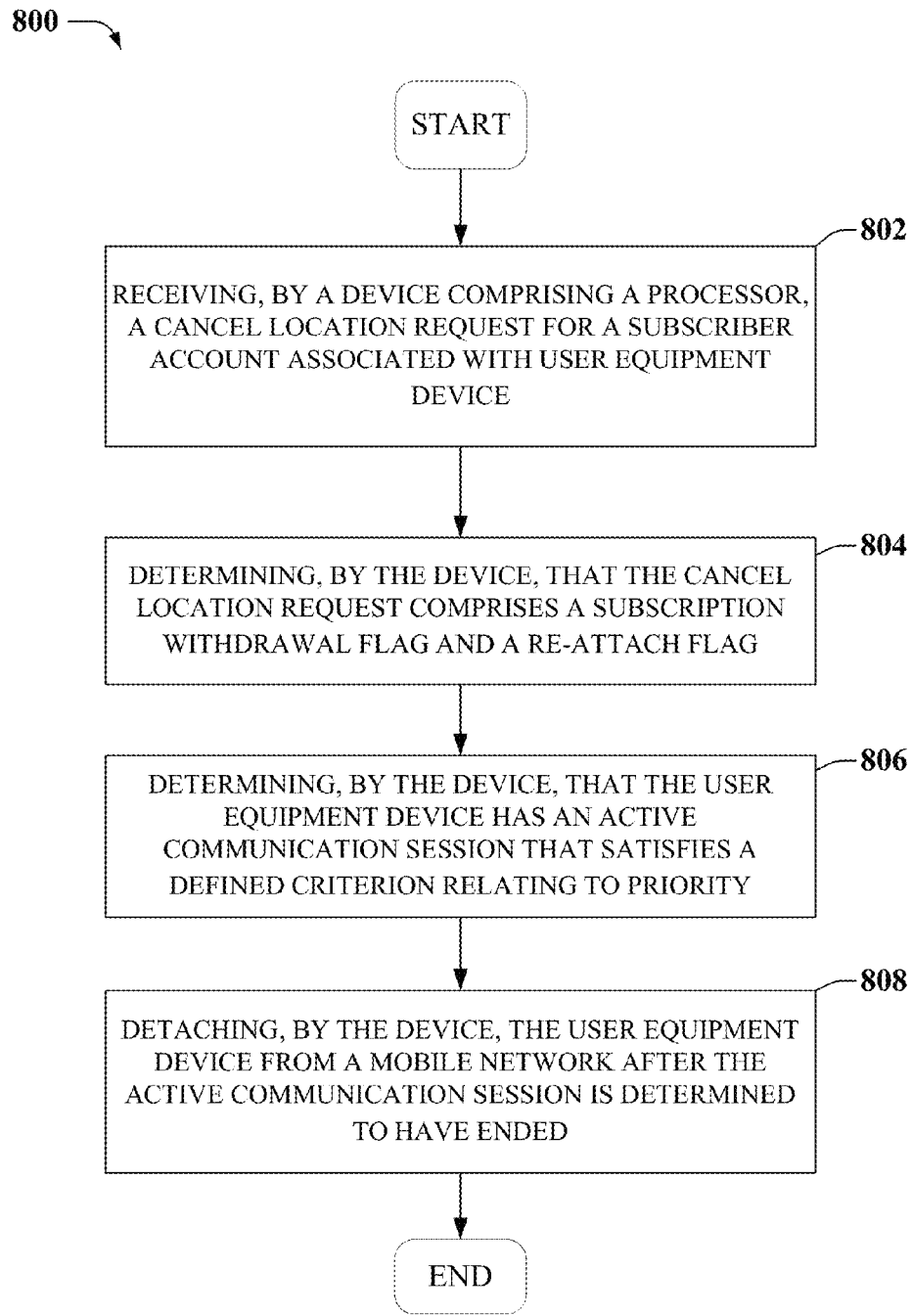
FIG. 8 illustrates a flow diagram of an example, non-limiting embodiment of a method for maintaining an active communication session during subscriber maintenance activities as described herein.

Turning now to FIG. 8, illustrated is a flow diagram 800 of an example, non-limiting embodiment of a method for maintaining an active communication session during subscriber maintenance activities as described herein.

Method 800 can start at 802 where the method comprises receiving, by a device comprising a processor, a cancel location request for a subscriber account associated with user equipment device. At 804 the method can include determining, by the device, that the cancel location request comprises a subscription withdrawal flag and a re-attach flag. At 806 the method can include determining, by the device, that the user equipment device has an active communication session that satisfies a defined criterion relating to priority. At 808 the method can include detaching, by the device, the user equipment device from a mobile network after the active communication session is determined to have ended.

Figure 9:
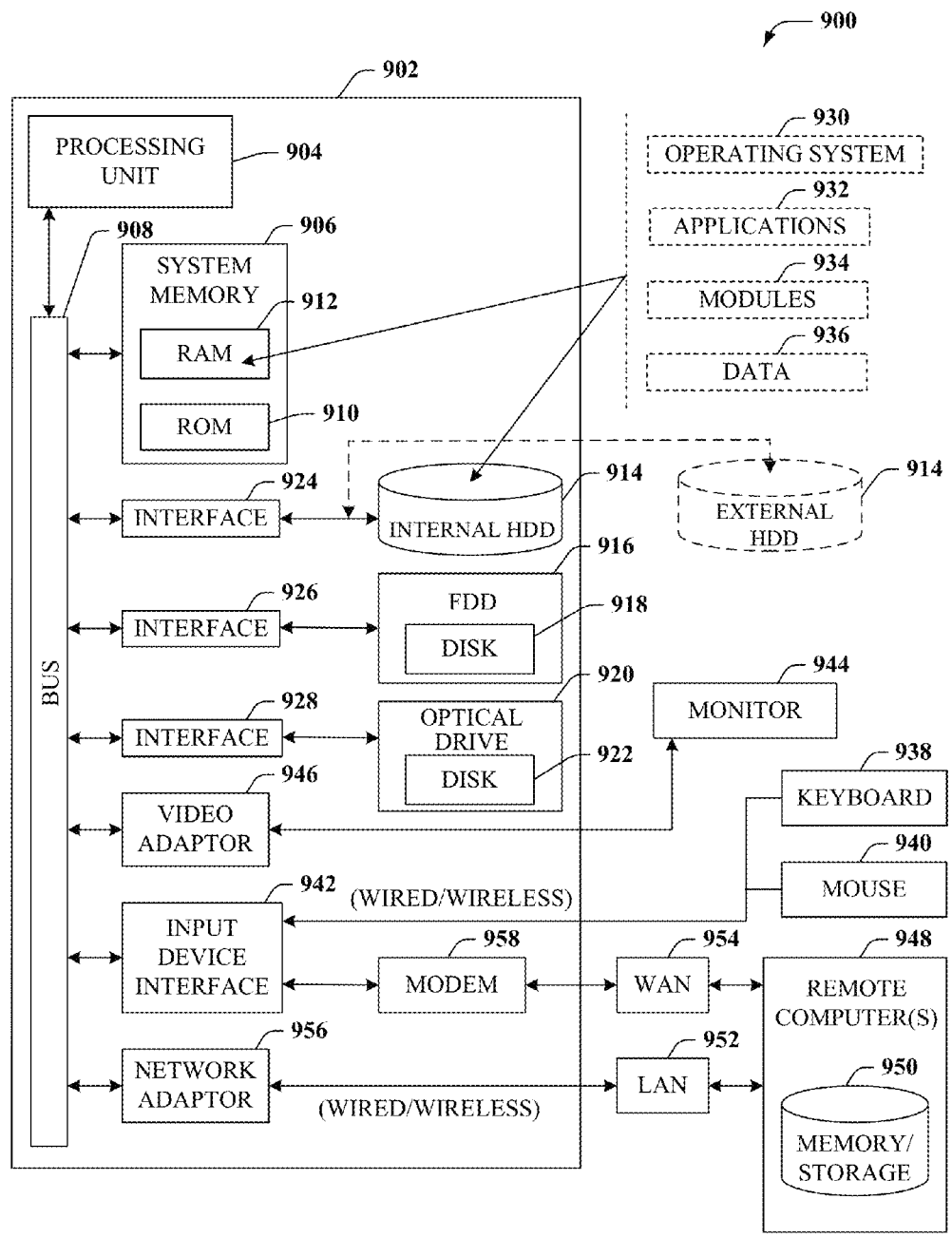
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the subscriber management system disclosed in any of the previous systems 100, 200, and/or 300.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Non-transitory computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 9, the example environment 900 for implementing various embodiments of the aspects described herein comprises a computer 902, the computer 902 comprising a processing unit 904, a system memory 906 and a system bus 908. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, comprising an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can comprise a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically comprises other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also comprise a wireless AP disposed thereon for communicating with the wireless adapter 956.

When used in a WAN networking environment, the computer 902 can comprise a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

In an embodiment of the subject application, the computer 1002 can provide the environment and/or setting in which one or more of the dynamic secure mobile network systems disclosed in FIGS. 1-6 can be operated from.

Figure 10:
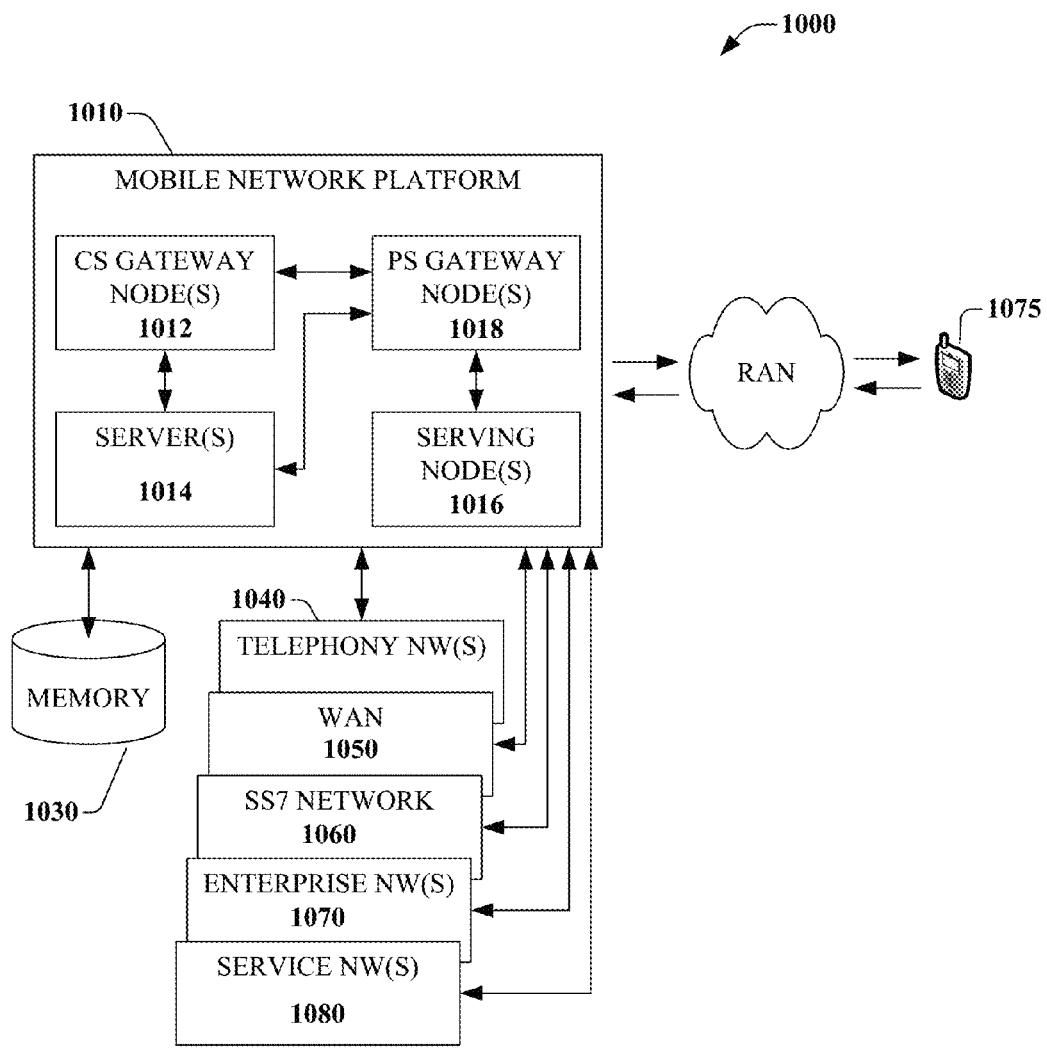
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 comprises CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication. Mobile network platform 1010 can also comprise the MMEs, HSS/PCRFs, SGWs, and PGWs disclosed herein.

In addition to receiving and processing CS-switched traffic and signaling, PS gateway node(s) 1018 can authorize and authenticate PS-based data sessions with served mobile devices. Data sessions can comprise traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also comprises serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can comprise one or more processors configured to confer at least in part the functionality of macro network platform 1010. To that end, the one or more processor can execute code instructions stored in memory 1030, for example. It is should be appreciated that server(s) 1014 can comprise a content manager 1015, which operates in substantially the same manner as described hereinbefore.

In example embodiment 1000, memory 1030 can store information related to operation of wireless network platform 1010. Other operational information can comprise provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIGS. 9 and 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, field programmable gate array, graphics processor, or software defined radio reconfigurable processor and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining that a cancel location request has been received for a mobile subscriber account associated with a mobile device communicatively coupled to a network device of a mobile network;
determining that the mobile device has an active communication session with the network device of the mobile network that satisfies a defined criterion; and
delaying a detaching of the mobile device from the network device triggered by the cancel location request until the active communication session has ended, wherein the detaching comprises changing subscriber information associated with the mobile subscriber account that causes the active communication session to terminate.

2. The system of claim 1, wherein the operations further comprise:
determining whether the cancel location request comprises a re-attach flag; and
detaching the mobile device from the network device in response to determining that the re-attach flag is not included in the cancel location request, and waiting to detach the mobile device from the network device until the active communication session has ended in response to determining that the re-attach flag is included in the cancel location request.

3. The system of claim 2, wherein the active communication session is a dedicated bearer communication session comprising a voice over internet protocol communication or video communication.

4. The system of claim 1, wherein the operations further comprise:
determining that the active communication session is associated with a mobile network help session.

5. The system of claim 1, wherein the cancel location request is associated with a mobile network maintenance activity.

6. The system of claim 1, wherein the operations further comprise:
determining that the cancel location request is associated with a subscriber withdrawal request.

7. The system of claim 1, wherein the operations further comprise:
determining that the cancel location request is not associated with a subscriber withdrawal request; and
detaching the active communication session from the network device.

8. The system of claim 1, wherein the operations further comprise:
refreshing a portion of the subscription information associated with the mobile subscriber account during the active communication session, and wherein the refreshing does not interrupt the active communication session.

9. The system of claim 8, wherein the refreshing the portion of subscription information further comprises detaching a second active communication session that does not satisfy the defined criterion.

10. The system of claim 8, wherein the refreshing the portion of subscription information comprises saving the portion of subscription information, and reloading the portion of subscription information to a subscriber data store.

11. The system of claim 1, wherein the operations further comprise:
detaching the mobile subscriber account from the network device in response to determining that the active communication sessions has ended; and
refreshing the subscription information associated with the mobile subscriber account.

12. A method, comprising:
receiving, by a device comprising a processor, a cancel location request for a subscriber account associated with user equipment device communicatively coupled to a mobile network; and
in response to determining that the cancel location request comprises a subscription withdrawal flag and a re-attach flag and determining that the user equipment device has an active communication session with a network device of the mobile network that satisfies a defined criterion, delaying a detaching, by the device, of the user equipment device from the network device of the mobile network until the active communication session is determined to have ended, wherein the detaching comprises making a change to subscriber information associated with the subscriber account that causes the active communication session to terminate.

13. The method of claim 12, further comprising:
detaching, by the device, the user equipment device from the network device in response to determining that the subscription withdrawal flag and the re-attach flag are not included in the cancel location request.

14. The method of claim 12, wherein the defined criterion comprises the active communication session is associated with a troubleshooting session.

15. The method of claim 12, wherein the defined criterion comprises the active communication session is a dedicated bearer communication session.

16. The method of claim 12, further comprising:
refreshing, by the device, a portion of the subscription information associated with the subscriber account during the active communication session, wherein the refreshing does not interrupt the active communication session.

17. The method of claim 12, further comprising:
detaching, by the device, a second active communication session from the network device that does not satisfy the defined criterion before the active communication session ends.

18. A non-transitory machine-readable storage medium, comprising executable instructions that, when executed by a processor, facilitate performance of operations, comprising:
receiving a cancel location request for a subscriber account associated with user equipment device communicatively couple to a mobile network; and
in response to determining that the cancel location request comprises a subscription withdrawal flag and a re-attach flag and determining that the user equipment device has an active communication session that satisfies a defined criterion, delaying a detaching of the user equipment device from the mobile network until the active communication session is determined to have ended, wherein the detaching comprises modifying subscriber information associated with the subscriber account that causes the active communication session to terminate.

19. The non-transitory machine-readable storage medium of claim 18, wherein the operations further comprise:
   detaching the user equipment device from the mobile network in response to determining that the subscription withdrawal flag and the re-attach flag are not included in the cancel location request.

20. The non-transitory machine-readable storage medium of claim 18, wherein the operations further comprise:
   refreshing a portion of the subscription information associated with the subscriber account during the active communication session, and wherein the refreshing does not interrupt the active communication session.

\* \* \* \* \*